United States Patent
Yoo et al.

(10) Patent No.: US 9,731,699 B2
(45) Date of Patent: Aug. 15, 2017

(54) VIBRATION REDUCTION CONTROL APPARATUS OF HYBRID VEHICLE

(71) Applicants: Hyundai Motor Company, Seoul (KR); Kia Motors Corporation, Seoul (KR)

(72) Inventors: Tae Il Yoo, Anyang-si (KR); Gu Bae Kang, Yongin-si (KR); Neung Seop Oh, Seoul (KR); Hyung Seuk Ohn, Suwon-si (KR); Han Hee Park, Suwon-si (KR); Seong Yeop Lim, Seoul (KR); So Young Sim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 23 days.

(21) Appl. No.: 14/789,053

(22) Filed: Jul. 1, 2015

(65) Prior Publication Data

US 2016/0185334 A1    Jun. 30, 2016

(30) Foreign Application Priority Data

Dec. 26, 2014  (KR) .......................... 10-2014-0190993

(51) Int. Cl.
*B60W 10/08* (2006.01)
*B60K 6/442* (2007.10)
(Continued)

(52) U.S. Cl.
CPC ............. *B60W 10/08* (2013.01); *B60K 6/387* (2013.01); *B60K 6/442* (2013.01); *B60K 6/547* (2013.01);
(Continued)

(58) Field of Classification Search
CPC ...... B60W 10/06; B60W 10/08; B60W 20/10; B60W 20/00; B60W 30/20; B60W 30/19;
(Continued)

(56) References Cited

U.S. PATENT DOCUMENTS 9,008,941  B2    4/2015  Park et al.
2013/0006459 A1  1/2013  Kim et al.
(Continued)

FOREIGN PATENT DOCUMENTS

JP    2000-69607 A    3/2000
JP    2013-075591 A    4/2013
(Continued)

*Primary Examiner* — Abby Lin
(74) *Attorney, Agent, or Firm* — Morgan Lewis & Bockius LLP

(57) ABSTRACT

A vibration reduction control apparatus of a hybrid vehicle having a first motor connected to a first side of an engine and a second motor connected to a second side of the engine through an engine clutch, may include a hybrid controller, an engine controller configured to control the engine, a first motor controller configured to control the first motor, a second motor controller configured to control the second motor, and an anti-spring controller configured between the first motor controller and the second motor controller and control torques of the first and second motors using frequencies of the first motor and the second motor, respectively, wherein the hybrid controller is configured to selectively transmit a torque signal of the engine, a torque signal of the first motor, and a torque signal of the second motor to the engine controller, the first motor controller, and the second motor controller, respectively.

8 Claims, 6 Drawing Sheets

(51) Int. Cl.
*B60W 20/10* (2016.01)
*B60K 6/387* (2007.10)
*B60W 10/06* (2006.01)
*B60W 30/20* (2006.01)
*B60K 6/547* (2007.10)
*B60K 6/48* (2007.10)
*B60W 50/00* (2006.01)

(52) U.S. Cl.
CPC ............ *B60W 10/06* (2013.01); *B60W 20/10* (2013.01); *B60W 30/20* (2013.01); *B60K 2006/4825* (2013.01); *B60W 2050/001* (2013.01); *B60W 2710/0666* (2013.01); *B60W 2710/083* (2013.01); *Y02T 10/6252* (2013.01); *Y02T 10/6286* (2013.01); *Y10S 903/93* (2013.01)

(58) Field of Classification Search
CPC ... B60W 2710/083; B60W 2710/0666; B60W 50/06; B60W 2050/001; B60W 2030/203; B60W 2030/206; B60W 2510/0241; Y10S 903/93; B60L 2270/145; H02P 6/10; H02P 5/485; H02P 5/48; B60K 6/387; B60K 6/547; B60K 6/26; B60K 6/448; B60K 6/48; B60K 6/445; B60K 2006/4825

See application file for complete search history.

(56) References Cited

U.S. PATENT DOCUMENTS

| | | |
|---|---|---|
| 2014/0121872 A1 | 5/2014 | Oh et al. |
| 2015/0263657 A1 | 9/2015 | Park et al. |
| 2015/0321660 A1* | 11/2015 | Kanayama ............ B60W 20/40 701/22 |
| 2015/0321661 A1* | 11/2015 | Hayashi ................ B60W 10/02 701/22 |

FOREIGN PATENT DOCUMENTS

| | | |
|---|---|---|
| JP | 2013-208960 A | 10/2013 |
| JP | 2014-073756 A | 4/2014 |
| KR | 10-2011-0049934 A | 5/2011 |
| KR | 10-2013-0002714 A | 1/2013 |
| KR | 10-2014-0055089 A | 5/2014 |

* cited by examiner

VIBRATION REDUCTION CONTROL APPARATUS OF HYBRID VEHICLE

CROSS-REFERENCE TO RELATED APPLICATION

The present application is based on and claims the benefit of priority to Korean Patent Application No. 10-2014-0190993, filed on Dec. 26, 2014, the entire contents of which is incorporated herein for all purposes by this reference.

BACKGROUND OF THE INVENTION

Field of the Invention

The present disclosure relates to a vibration reduction control apparatus of a hybrid vehicle, and more particularly, to a vibration reduction control apparatus of a hybrid vehicle capable of effectively reducing a speed vibration phenomenon due to spring resonance between an engine and motors in the hybrid vehicle in which an engine clutch having a damping spring is used.

Description of Related Art

A hybrid vehicle means a vehicle which is driven by efficiently combining two or more kinds of different power sources. In the most cases, the hybrid vehicle means a vehicle which is driven by an engine obtaining torque by burning fuel (e.g., fossil fuel such as gasoline) and a motor (motor/generator) obtaining the torque by power of a battery.

The hybrid vehicle is a future vehicle capable of promoting a decrease of exhaust gas and improvement of fuel efficiency by adopting the motor (motor/generator) as well as the engine as an auxiliary power source. A research into the hybrid vehicle has been further actively conducted in order to meet demands of the times that the fuel efficiency needs to be improved and an environment-friendly product needs to be developed. The hybrid vehicle may be classified into various structures such as a series hybrid vehicle, a parallel hybrid vehicle, a compound hybrid vehicle, and the like.

Meanwhile, according to a transmission mounted electric drive (TMED) system among the parallel hybrid vehicles, the motor is connected to the transmission and an engine clutch capable of performing a transfer function of an EV mode and an HEV mode is installed between the engine and the motor.

In addition, as the engine clutch, a dry type clutch having a damping spring is mainly used. The dry type clutch had an effective advantage in terms of efficiency improvement of friction loss, but had disadvantages that a low frequency vibration of 10 to 20 Hz occurs by an inertia change depending on whether or not a dual clutch of the transmission has a slip during the driving of the vehicle because the dry type clutch has lower hysteresis characteristics than a wet type clutch due to the damping spring, and a negative effect that a driver easily recognizes the low frequency vibration because the low frequency vibration is not rapidly attenuated occurs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing the above-mentioned problems occurring in the prior art while advantages achieved by the prior art are maintained intact.

An aspect of the present disclosure provides a vibration reduction control apparatus of a hybrid vehicle capable of effectively reducing a speed vibration phenomenon due to spring resonance between an engine and motors in the hybrid vehicle in which an engine clutch having a damping spring is used.

According to an exemplary embodiment of the present disclosure, a vibration reduction control apparatus of a hybrid vehicle having a first motor connected to one side of an engine and a second motor connected to the other side of the engine through an engine clutch, may include a hybrid controller, an engine controller configured to control the engine, a first motor controller configured to control the first motor, a second motor controller configured to control the second motor, and an anti-spring controller configured to be installed between the first motor controller and the second motor controller and control torques of the first and second motors using frequencies of the first motor and the second motor, respectively, wherein the hybrid controller is configured to selectively transmit a torque signal of the engine, a torque signal of the first motor, and a torque signal of the second motor to the engine controller, the first motor controller, and the second motor controller, respectively.

The engine controller may control a driving of the engine by the torque signal of the engine transmitted from the hybrid controller.

The first motor controller may control a driving of the first motor by a summation torque signal of the first motor in which the torque signal of the first motor transmitted from the hybrid controller and the torque signal of the first motor output from the anti-spring controller are summed.

The second motor controller may control a driving of the second motor by a summation torque signal of the second motor in which the torque signal of the second motor transmitted from the hybrid controller and the torque signal of the second motor output from the anti-spring controller are summed.

The anti-spring controller may have an anti-spring torque generator determining a torque value for reducing a speed resonance phenomenon using speed of the first motor and speed of the second motor and a torque-load distributor determining a distribution ratio of resonance reduction torque of the first and second motors.

The anti-spring torque generator may have an error detector detecting a difference value between the speed of the first motor and the speed of the second motor, a first proportional and integral (PI) controller determining a torque value of the first motor by a first proportional gain and a first integral gain depending on the difference value of the error detector, and a second PI controller determining a torque value of the second motor by a second proportional gain and a second integral gain depending on the difference value of the error detector.

The error detector may be connected with a converter converting the speed of the first motor into speed of the engine.

The torque-load distributor may be configured to determine distribution ratios of the first and second motors for a torque output in order to reduce the speed resonance.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
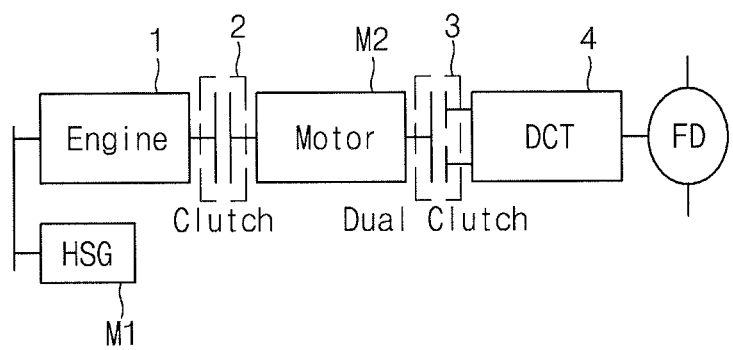
FIG. 1 is a schematic view showing a hybrid vehicle of a general transmission mounted electric drive (TMED) system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic view showing a hybrid vehicle of a general transmission mounted electric drive (TMED) system.

Referring to FIG. 1, a hybrid vehicle of a transmission mounted electric drive (TMED) system includes a first motor M1 connected to one side of an engine 1, a second motor M2 connected to the other side of the engine 1 through an engine clutch 2, a transmission 4 connected to the second motor M2 through a dual clutch 3, and the like.

The first motor M1 includes a hybrid start and generator (HSG) that performs a start function and a generation function of the engine 1, and the first motor M1 and the engine 1 may be connected by a belt having a pulley ratio of 1:2.48, or the like.

In the case in which a connection between the engine 1 and the second motor M2 is disconnected by a release of the engine clutch 2, the vehicle may be driven by only the second motor M2, and in the case in which the engine 1 and the second motor M2 are connected by a coupling operation of the engine clutch 2, the vehicle may be driven by the engine 1 and the second motor M2.

However, at the time of the coupling operation of the engine clutch 2 configured of a dry type clutch having a damping spring, a speed difference between the engine 1 and the second motor M2 occurs at the time of a slip control of the dual clutch. Due to the above-mentioned speed difference, an engine-engine clutch-motor system generates a low frequency vibration of 10 to 25 Hz and the above-mentioned low frequency vibration is not rapidly attenuated. Therefore, in order to prevent the vibration from being easily recognized by a driver, the vibration reduction control apparatus of the hybrid vehicle according to the present disclosure determines a torque distribution ratio of the first and second motors M1 and M2 in response to the speed difference between the first motor M1 and the second motor M2, thereby making it possible to reduce the speed difference between the first motor M1 and the second motor M2 and effectively prevent the above-mentioned low frequency vibration.

Figure 2:
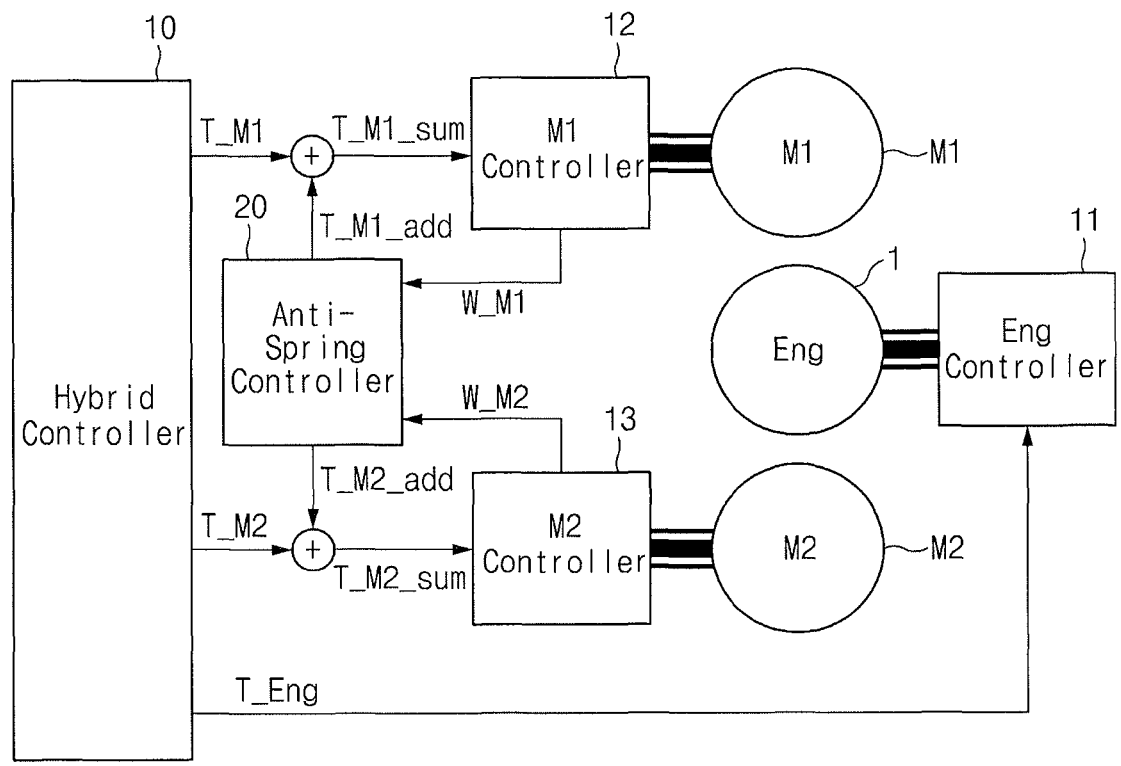
FIG. 2 is a configuration diagram showing a vibration reduction control apparatus of a hybrid vehicle according to the present disclosure.

As shown in FIG. 2, the vibration reduction control apparatus of the hybrid vehicle according to the present disclosure includes a hybrid controller 10, an engine controller 11 controlling the engine 1, a first motor controller 12 controlling the first motor M1, a second motor controller 13 controlling the second motor M2, and an anti-spring controller 20 installed between the first motor controller 12 and the second motor controller 13 and controlling torques of the first and second motors M1 and M2 using the respective frequencies of the first motor M1 and the second motor M2.

The hybrid controller 10 is electrically connected to the engine controller 11, the first motor controller 12, and the second motor controller 13. Particularly, the hybrid controller 10 is configured to selectively transmit a torque signal T_Eng of the engine, a torque signal T_M1 of the first motor, and a torque signal T_M2 of the second motor to the engine controller 11, the first motor controller 12, and the second motor controller 13, respectively, depending on a control signal of an electronic control unit (ECU) of the vehicle.

The engine controller 11 controls a driving of the engine 1 by the torque signal T_Eng of the engine transmitted from the hybrid controller 10.

A summation torque signal T_M1_sum of the first motor M1 is output by summing the torque signal T_M1 of the first motor M1 transmitted from the hybrid controller 10 and a torque signal T_M1_add of the first motor M1 output from the anti-spring controller 20, and the first motor controller 12 receives the summation torque signal T_M1_sum of the first motor M1, so as to control the driving of the first motor M1.

A summation torque signal T_M2_sum of the second motor M2 is output by summing the torque signal T_M2 of the second motor M2 transmitted from the hybrid controller 10 and a torque signal T_M2_add of the second motor M2 output from the anti-spring controller 20, and the second motor controller 13 receives the summation torque signal T_M2_sum of the second motor M2, so as to control the driving of the second motor M2.

Figure 3:
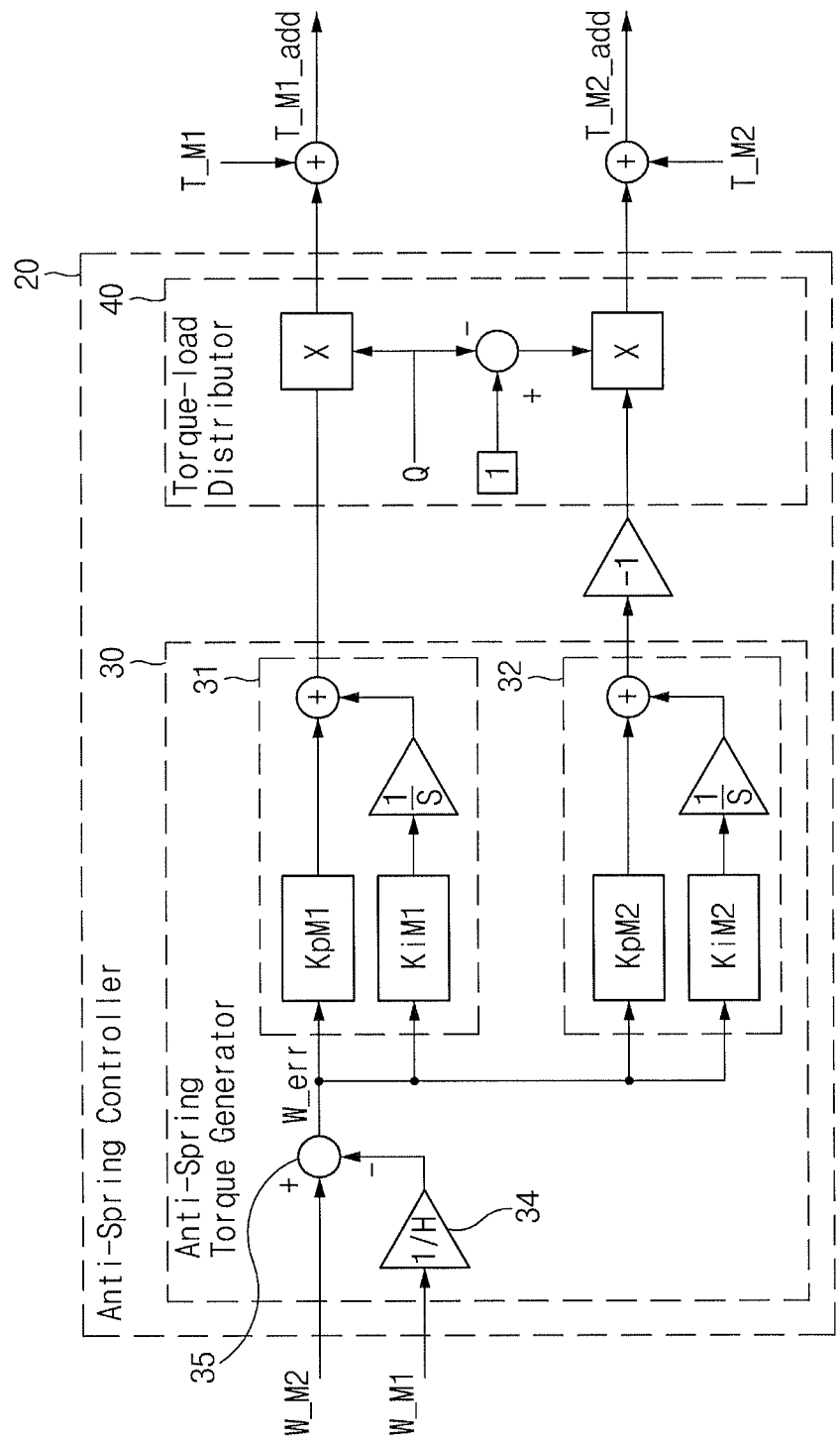
FIG. 3 is a block diagram showing an anti-spring controller of the vibration reduction control apparatus of the hybrid vehicle according to the present disclosure.

The anti-spring controller 20 includes an anti-spring torque generator 30 determining a torque value for reducing a speed resonance phenomenon using speed W_M1 of the first motor M1 and speed W_M2 of the second motor M2, and a torque-load distributor 40 determining a distribution ratio of resonance reduction torques of first and second motors M1 and M2, as shown in FIG. 3.

The anti-spring torque generator 30 includes an error detector 35 detecting a difference value W_err between the speed W_M1 of the first motor M1 and the speed W_M2 of the second motor M2, a first proportional and integral (PI) controller 31 determining a torque value of the first motor M1 through a proportional gain KpM1 and an integral gain KiM1 depending on the difference value W_err of the error detector 35, and a second proportional and integral (PI) controller 32 determining a torque value of the second motor M2 through a proportional gain KpM2 and an integral gain KiM2 depending on the difference value W_err of the error detector 35.

In an ideal state in which the low frequency vibration does not occur, the speed W_M1 of the first motor M1 and the speed W_M2 of the second motor M2 need to be equal to each other at the time of the coupling operation of the engine clutch 2, but the difference value W_err occurs between the speed W_M1 of the first motor M1 and the speed W_M2 of the second motor M2 due to a slip control of the dual clutch. In this case, the error detector 35 detects the difference value W_err as an error value.

In addition, since the engine 1 and the first motor M1 are connected at a predetermined pulley ratio H, a convert 34 converting the speed W_M1 of the first motor M1 into speed of the engine 1 is connected to the error detector 35. For example, by multiplying the speed W_M1 of the first motor M1 with a value of 1/H, the speed of the engine may be deduced.

The first PI controller 31 and the second PI controller 32 may be connected in parallel to each other, so as to separately determine the torque value of the first motor M1 and the torque value of the second motor M2.

The torque-load distributor 40 is a logic determining distribution ratios of the first motor M1 and the second motor M2 for the torque outputs T_M1_add and T_M2_add in order to reduce the speed resonance.

Meanwhile, a Q value of the torque-load distributor 40, which is a resonance reduction distribution ratio Q in which the first motor M1 and the second motor M2 are involved in a resonance task distribution ratio, has values between 0 and 1. When the Q value is 0, all resonance speeds may be reduced by the second motor M2, and when the Q value is 1, all resonance speeds may be reduced by the first motor M1.

In the case in which the resonance reduction torque may not be output because the output of the first motor M1 reaches a maximum output state that is allowable by the first motor M1 for the purpose of a power transfer or regenerative braking of the vehicle, in the case in which the first motor M1 is in a fault state in which the first motor M1 may not generate the output, or vice versa, the Q value may have the values between 0 and 1.

In addition, the Q value may have the values between 0 and 1, for the purpose of distributing heat values of the first motor M1 and the second motor M2 or sharing the task to a side having predominant efficiency at the time of outputting the resonance reduction torque using the first and second motors M1 and M2.

FIG. 4, FIG. 5 and FIG. 6 are graphs showing results of speed resonance reduced by the anti-spring controller 20 according to the present disclosure.

Figure 4A:
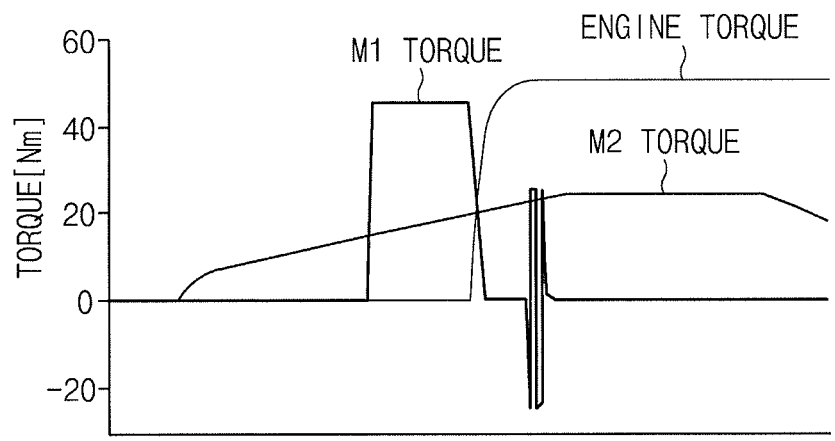
FIG. 4A, FIG. 4B, FIG. 4C, FIG. 5A, FIG. 5B, FIG. 5C, FIG. 6A, FIG. 6B and FIG. 6C are graphs showing results of speed resonance reduced by the anti-spring controller according to the present disclosure.
Figure 4B:
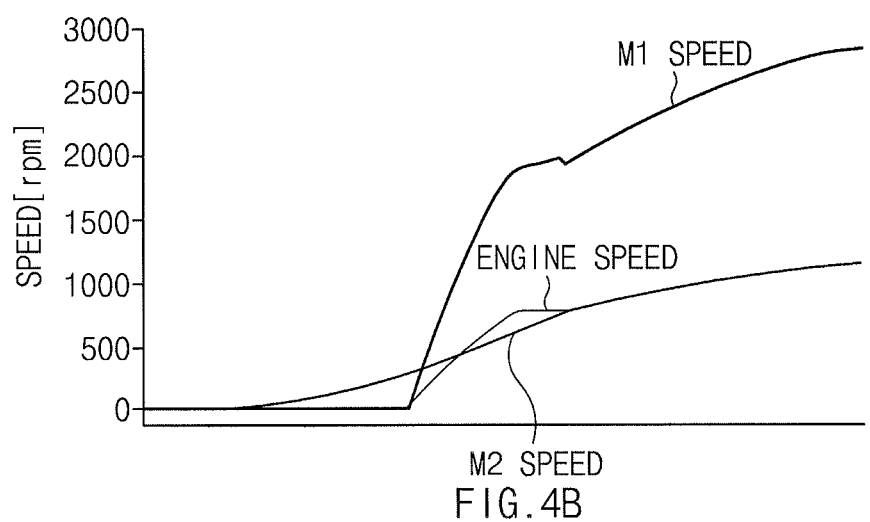
Figure 4C:
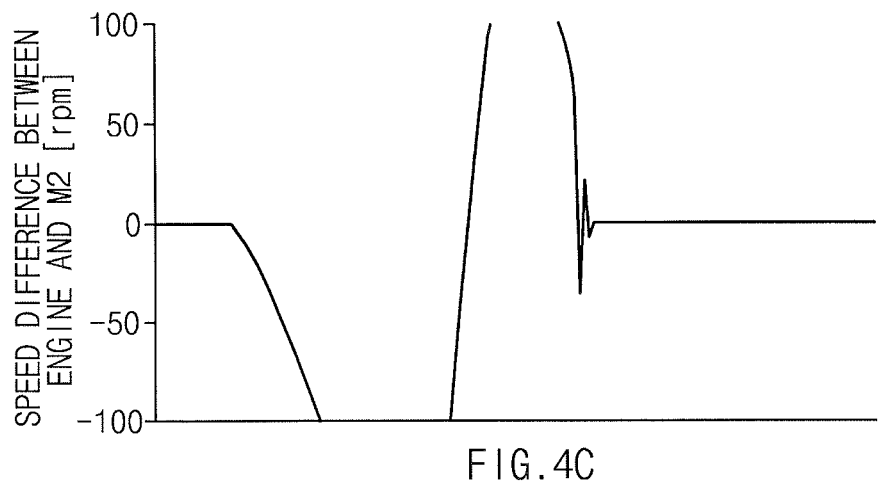

FIG. 4 is a graph showing a result obtained after the speed resonances of the engine 1 and the second motor 2 are reduced using only the first motor M1 (i.e., when the Q value is 1), wherein FIG. 4A is a graph showing torque change values of the first motor M1, the engine 1, and the second motor M2, FIG. 4B is a graph showing speed change values of the first motor M1, the engine 1, and the second motor M2, and FIG. 4C is a graph showing a speed difference value between the engine 1 and the second motor M2. As shown in FIG. 4C, it may be seen that the speed resonance is reduced using only the first motor M1.

Figure 5A:
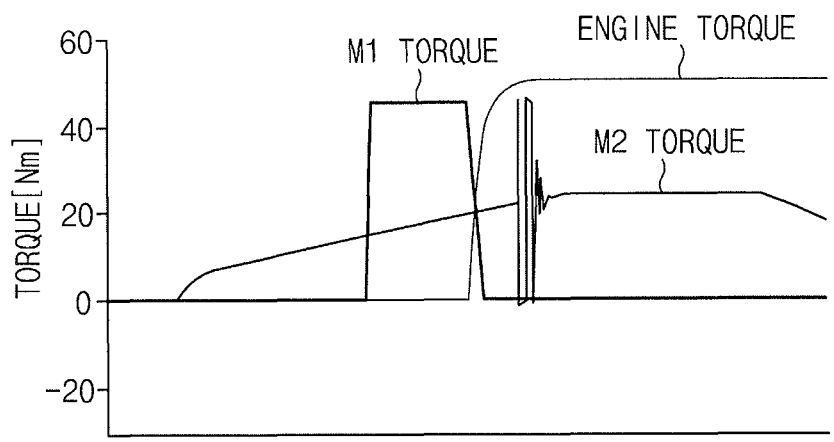
Figure 5B:
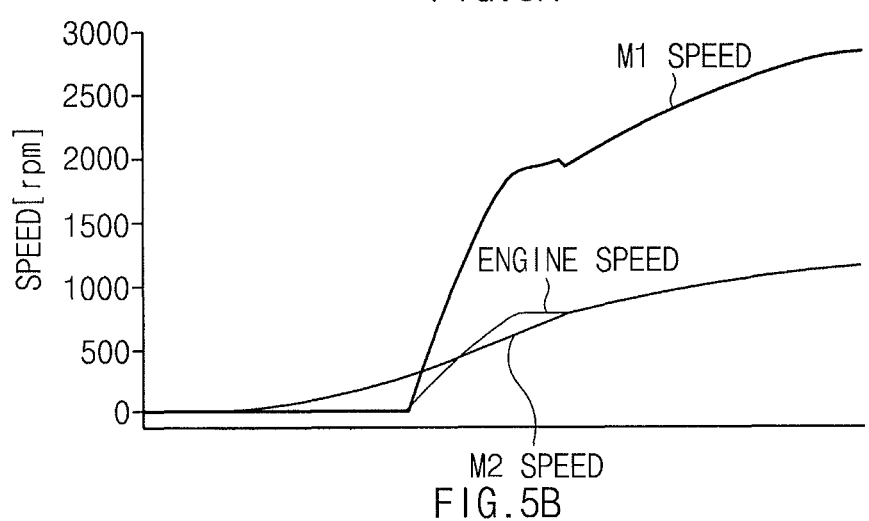
Figure 5C:

FIG. 5 is a graph showing a result obtained after the speed resonances of the engine 1 and the second motor M2 are reduced using only the second motor M2 (i.e., when the Q value is 0), wherein FIG. 5A is a graph showing torque change values of the first motor M1, the engine 1, and the second motor M2, FIG. 5B is a graph showing speed change values of the first motor M1, the engine 1, and the second motor M2, and FIG. 5C is a graph showing a speed difference value between the engine 1 and the second motor M2. As shown in FIG. 5C, it may be seen that the speed resonance is reduced using only the second motor M2.

Figure 6A:
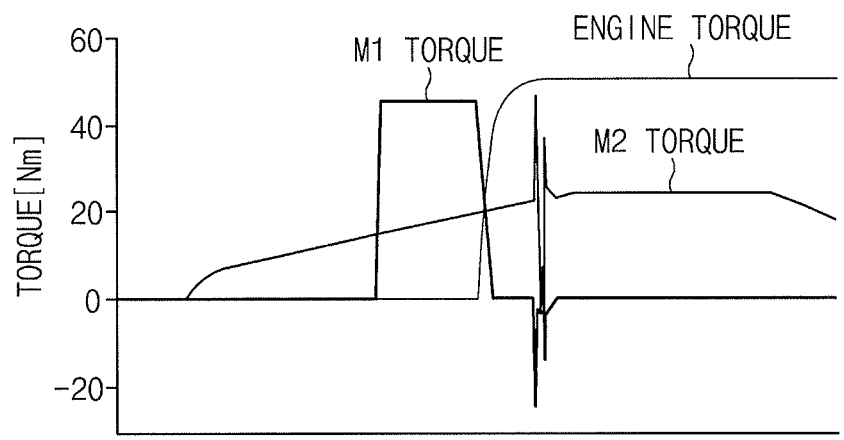
Figure 6B:
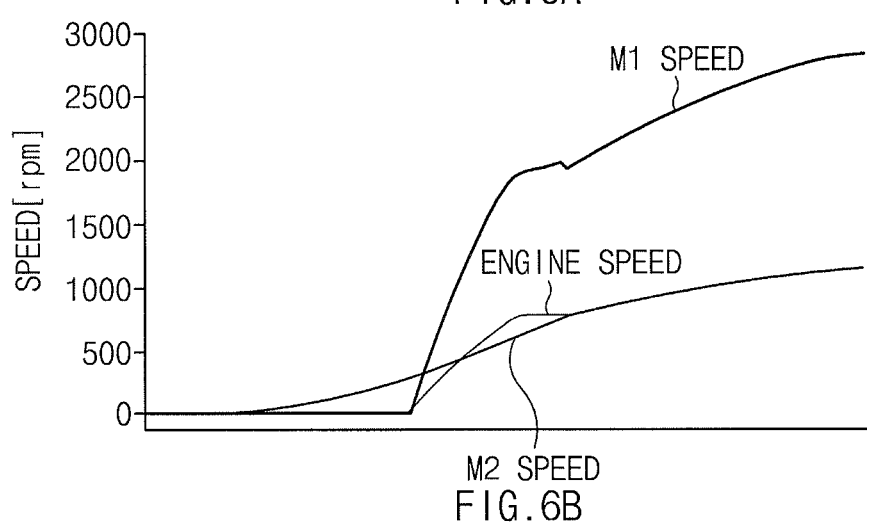
Figure 6C:
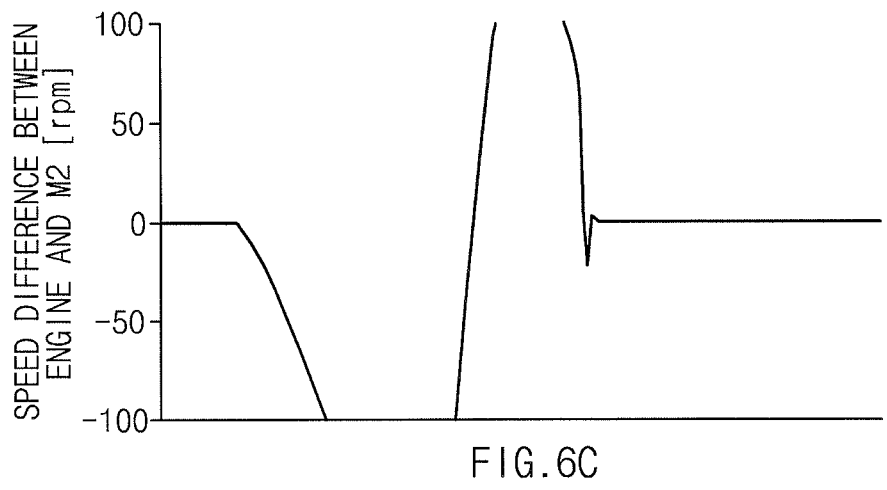

FIG. 6 is a graph showing a result obtained after the speed resonances of the engine 1 and the second motor M2 are reduced using both the first and second motors M1 and M2 (i.e., when the Q value is 0.5), wherein FIG. 6A is a graph showing torque change values of the first motor M1, the engine 1, and the second motor M2, FIG. 6B is a graph showing speed change values of the first motor M1, the engine 1, and the second motor M2, and FIG. 6C is a graph showing a speed difference value between the engine 1 and the second motor M2. As shown in FIG. 6C, it may be seen that the speed resonance is reduced using the first motor M1 and the second motor M2.

Referring to FIG. 4, FIG. 5 and FIG. 6, it may be seen that the speed resonances of the engine 1 and the second motor M2 may be very effectively reduced by the anti-spring controller 20 according to the present disclosure in the case in which a shift occurs or the slip occurs at the clutch of the transmission during the driving at the HEV mode.

As described above, it is possible to effectively reduce the speed vibration phenomenon due to the spring resonance between the engine and the second motor by the anti-spring control logic in the hybrid vehicle in which the engine clutch having the damping spring is used.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vibration reduction control apparatus of a hybrid vehicle having a first motor connected to a first side of an engine and a second motor connected to a second side of the engine through an engine clutch, the vibration reduction control apparatus comprising:
   a hybrid controller;
   an engine controller configured to control the engine;
   a first motor controller configured to control the first motor;
   a second motor controller configured to control the second motor; and
   an anti-spring controller configured to be installed between the first motor controller and the second motor controller, the anti-spring controller being configured to determine and control torques of the first and second motors using speed values of the first motor and the second motor, respectively,
   wherein the hybrid controller is configured to selectively transmit a torque signal of the engine, a torque signal of the first motor, and a torque signal of the second motor to the engine controller, the first motor controller, and the second motor controller, respectively.

2. The vibration reduction control apparatus according to claim 1, wherein the engine controller controls a driving of the engine by the torque signal of the engine transmitted from the hybrid controller.

3. The vibration reduction control apparatus according to claim 1, wherein the first motor controller controls a driving of the first motor by a summation torque signal of the first motor in which the torque signal of the first motor transmitted from the hybrid controller and the torque signal of the first motor output from the anti-spring controller are summed.

4. The vibration reduction control apparatus according to claim 1, wherein the second motor controller controls a driving of the second motor by a summation torque signal of the second motor in which the torque signal of the second motor transmitted from the hybrid controller and the torque signal of the second motor output from the anti-spring controller are summed.

5. The vibration reduction control apparatus according to claim 1, wherein the anti-spring controller includes:
   an anti-spring torque generator configured to determine a torque value for reducing a speed resonance phenomenon using a speed of the first motor and a speed of the second motor; and
   a torque-load distributor configured to determine a distribution ratio of resonance reduction torque of the first and second motors.

6. The vibration reduction control apparatus according to claim 5, wherein the anti-spring torque generator includes:
   an error detector configured to detect a difference value between the speed of the first motor and the speed of the second motor;
   a first proportional and integral controller configured to determine a torque value of the first motor by a first proportional gain and a first integral gain depending on the difference value of the error detector; and
   a second proportional and integral controller configured to determine a torque value of the second motor by a second proportional gain and a second integral gain depending on the difference value of the error detector.

7. The vibration reduction control apparatus according to claim 6, wherein the error detector is connected with a converter converting the speed of the first motor into a speed of the engine.

8. The vibration reduction control apparatus according to claim 5, wherein the torque-load distributor is configured to determine distribution ratios of the first and second motors for a torque output to reduce the speed resonance phenomenon.

* * * * *